United States Patent
Haigh

[11] Patent Number: 5,943,124
[45] Date of Patent: Aug. 24, 1999

[54] MONITORING OF AN OPTICAL LINE

[75] Inventor: Neil Richard Haigh, Wirral, United Kingdom

[73] Assignee: BICC Public Limited Company, London, United Kingdom

[21] Appl. No.: 09/077,985
[22] PCT Filed: Dec. 19, 1996
[86] PCT No.: PCT/GB96/03126
§ 371 Date: Oct. 27, 1998
§ 102(e) Date: Oct. 27, 1998
[87] PCT Pub. No.: WO97/24821
PCT Pub. Date: Jul. 10, 1997

[30] Foreign Application Priority Data

Dec. 28, 1995 [GB] United Kingdom ............... 95266582

[51] Int. Cl.⁶ .................................................. G01N 21/41
[52] U.S. Cl. ........................................... 356/73.1; 385/37
[58] Field of Search ........................... 356/73.1; 385/37, 385/12; 359/130

[56] References Cited

U.S. PATENT DOCUMENTS 5,684,297  11/1997  Tardy ........................................ 385/12

Primary Examiner—Robert H. Kim
Assistant Examiner—Tu T. Nguyen
Attorney, Agent, or Firm—Nath & Associates; Gary M. Nath

[57] ABSTRACT

An optical line system comprises: (1) an optical fiber that includes a plurality of reflectors, for example Bragg gratings, located at different positions along the optical fiber; and (2) a monitoring arrangement located in the region of one end of the optical fiber for monitoring the system by an optical reflectometry method in which light is reflected by the reflectors. The system is characterized in that at least two of the reflectors have reflectivities that differ from one another, the reflector that is more distant from the monitoring arrangement having a higher reflectivity than the Bragg grating that is nearer to the monitoring arrangement. Preferably the reflectivities of the reflectors increases as the distance from the monitoring arrangement increase, the reflectivities preferably having the relationship (1) $R_{n-1} = (2T^2 R_{n+1}) - (1 + 4T_2 R_n)^{1/2} / 2T^2 R_n$ where: $R_n$ is the reflectivity of the n th relector from the monitoring arrangement, $R_{n-1}$ is the reflectivity of the (n−1)th reflector from the monitoring arrangement, and T is the transmission coefficient of any branch that may be present between the (n−1)th and the n th reflector (and is unity if no such branch exists). Such a system has the advantage that the signal-to-noise ratio of different reflectors is reduced.

7 Claims, 2 Drawing Sheets

MONITORING OF AN OPTICAL LINE

This invention relates to optical line systems, and in particular, optical line systems that are monitored. Such systems include, for example, optical networks for telecommunications purposes which are monitored for damage or deterioration, and optical sensor lines and networks which are monitored to obtain information about some parameter such as temperature or strain.

In such systems, it has been proposed to incorporate reflectors so that the system can be monitored by a reflectometry method such as optical time domain reflectometry (OTDR), optical frequency domain reflectometry (OFDR) and the like. Examples of such systems are described in WO-A-90/06498 and GB-A-2,280,326. WO-A-90/06498 describes an OTDR method for detecting losses in a passive optical network (PON) that includes a number of partial reflectors such as gratings at different positions along its length. GB-A-2,280,326 describes a method of providing the integrity of optical paths in an optical system, comprising sending an amplitude modulated diagnostic signal into the system. A number of gratings in the system produce a pattern of time spaced echoes unique to the particular part of the system. However, one problem that exists with such systems is the fact that the signal to noise ratio is not the same for all the reflectors, especially if the line system contains a number of branches, and the system may not have sufficient dynamic response to obtain clear signals from the reflectors, especially from those reflectors remote from the reflectometer.

According to the present invention, there is provided an optical line system which comprises:
(i) an optical fibre that includes a plurality of reflectors located at different positions along the optical fibre; and
(ii) a monitoring arrangement located in the region of one end of the optical fibre for monitoring the system by an optical reflectometry method in which light is reflected by the reflectors:

characterised in that at least two of the reflectors have reflectivities that differ from one another, the reflector that is more distant from the monitoring arrangement having a higher reflectivity than the reflector that is nearer to the monitoring arrangement, so as to give a generally constant signal-to-noise ratio of the reflected light received by the monitoring arrangement.

Normally the optical fibre will contain more than two reflectors, for example three or more in relatively simple systems but in other systems it may contain significantly higher numbers e.g. at least ten reflectors or even twenty or more reflectors. In such systems the reflectivities of the reflectors preferably increase in order of the distance from the monitoring arrangement, and most preferably not only do the reflectivities increase but also the difference between the reflectivities of adjacent reflectors increases in order of distance from the monitoring arrangement.

The line system according to the invention has the advantage that, by increasing the reflectivities of the reflectors at the remote end of the optical fibre the signal-to-noise ratio of the signals received at the monitoring arrangement is significantly improved for those reflectors, and so the difference between the signal-to-noise ratio of the reflectors nearest the monitoring arrangement and the reflectors farthest from the monitoring arrangement is reduced. In view of the reduction in variation of intensity of the reflected signals, it is possible to set upper and/or lower threshold values for the reflected signals thereby eliminating or reducing crosstalk arising from secondary reflections occurring between reflectors.

The particular form in which the reflectivities of the reflectors are distributed along the optical fibre will depend, among other things, on the configuration of the line system, and especially on whether and to what extent it is branched. It is shown below that if one neglects Rayleigh backscattering from the optical fibre, a substantially constant signal-to-noise ratio is obtained from the reflectors in the optical line system if the reflectivities of the reflectors are based on the relationship:

$$R_{n-1} = \frac{(2T^2 R_n + 1) - (1 + 4T^2 R_n)^{\frac{1}{2}}}{2T^2 R_n} \qquad \text{I}$$

Where:
$R_n$ is the reflectivity of the n th reflector from the monitoring arrangement;
$r_{n-1}$ is the reflectivity of the (n−1)th reflector from the monitoring arrangement,
T is the transmission coefficient of any branch that may be present between the (n−1)th and the n th reflector (and is unity if no such branch exists).

In the case of a system which has no branches between the last two reflectors, the most remote Bragg grating may have a reflectivity of about 100%, that is to say it will reflect substantially the entire monitoring signal, in which case the penultimate reflector preferably has a reflectivity in the range of 0.3 to 0.5 times that of the last reflector and especially from 0.35 to 0.45 times that of the last reflector. In such a system the antepenultimate reflector preferably has a reflectivity in the range of 0.2 to 0.25 times that of the last reflector (if no intervening branch exists). In such systems in which the transmission coefficient T in the formula (I) above is unity, the relationship can be expanded as a power series:

$$R_{n-1} = R_n - 2R_n^2 + 5R_n^3 \qquad \text{II}$$

For all the reflectors apart from the last two or three the values for the reflectivity are sufficiently small for the series to converge rapidly, and it is often an acceptably close approximation to the formula (I) for the reflectivities of the closest reflectors to be equal to one another, i.e. to set $$R_{n-1} = R_n \qquad \text{III}$$

For example, for all reflectors of reflectivity of 0.1 or less, formula III would give a variation in signal-to-noise ratio of not more than 20%, while for reflectors of reflectivity of 0.02 or less, the variation would be not more than 4%. Thus a system may comprise an optical fibre having a large number of reflectors arranged along its length of generally equal reflectivity, e.g. from 1 to 5%, while the three or four reflectors most remote from the monitoring equipment have increasing reflectivities. In the case of branched systems, for example telecommunications networks such as passive optical networks (PONs) in which an optical fibre has a number of branches between a head end and a number of end users, the difference between the reflectivity of adjacent reflectors will need to be yet greater. Thus, for example, if the system includes a 2:1 branch between the penultimate reflector and the last reflector, the penultimate reflector will typically have a reflectivity in the range of from 0.1 to 0.25, and especially from 0.15 to 0.2 times that of the last reflector.

Preferably the, or at least some of the reflectors are passive optical reflectors which reflect part of the pulse at a defined wavelength or range of wavelengths. A reflector may comprise a cleaved end of a fibre, or a mirror (especially if it is the reflector farthest from the monitoring arrangement) a tunable filter e.g. an acousto optic tunable filter or a grating. Advantageously at least some of the gratings are Bragg gratings formed within the optical fibre (preferably a single-mode optical fibre). Such gratings may be formed by exposing the optical fibre to beams of ultraviolet radiation that vary in intensity or which interfere with one another so as to generate a periodic variation of refractive index of the fibre core along its length. The gratings may be formed by a number of methods for example by a light induced method as described in U.S. Pat. No. 4,474,427, a two-beam interferometry method as described in international patent application No. WO 86/01303 or a phase mask method as described in U.S. Pat. No. 5,367,588, the disclosures of which are incorporated herein by reference. Thus for example in one arrangement, all the reflectors other than the most remote reflector from the monitoring arrangement may comprise Bragg gratings, and the most remote reflector may comprise a mirror, while in another arrangement all the reflectors may comprise Bragg gratings. The reflectivities of the gratings may be set by adjusting the material of the optical fibre, the degree of irradiation with ultraviolet light or the length of the grating (or by any combination thereof). Such gratings may be classified as type I or type II gratings in which type II gratings generally exhibit higher reflectivities, however they are characterised by a degree of damage to the core/cladding interface of the fibre. Type II gratings generally exhibit poorer transmission properties than type I gratings but may only need only be employed as the grating that is most remote from the monitoring arrangement, all the other gratings being type I.

Various optical line systems according to the present invention will now be described by way of example with reference to the accompanying drawings in which.

Figure 1:
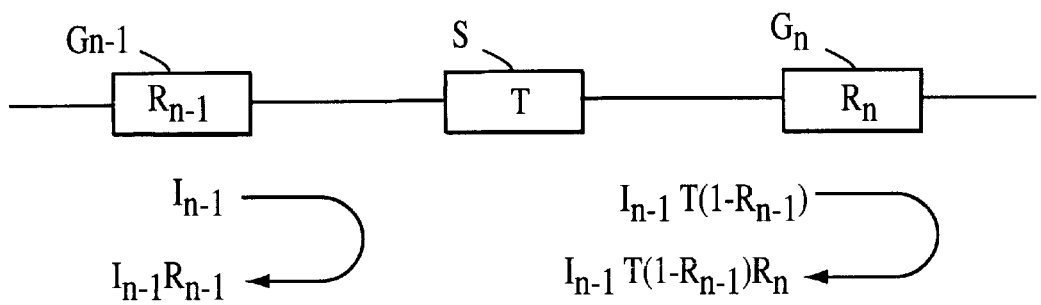
FIG. 1 shows a segment of an optical line system spanning two Bragg gratings.

Referring to the accompanying drawings, FIG. 1 shown schematically part of an optical line system comprising the n th Bragg grating $G_n$ from the monitoring apparatus and the (n−1)th grating $G_{n-1}$ from the monitoring apparatus, the two gratings having a splitter S located therebetween. In the simplest case of a linear system, i.e. one in which the splitter S does not exist, if the intensity of the monitoring signal occurring at point 1 of the system where it arrives at grating $G_{n-1}$ is $I_{n-1}$, and the reflectivity of the grating is $R_{n-1}$, then the intensity of the reflected signal is $I_{n-1} R_{n-1}$ and the intensity of the transmitted signal is $I_{n-1}(1-R_{n-1})$. The transmitted signal then arrives at grating $G_n$ (assuming negligible Rayleigh backscattering) with the result that the signal reflected by grating $G_n$ has an intensity $I_{n-1}(1-R_{n-1})(1-R_n)$ and the transmitted signal has an intensity $I_{n-1}(1-R_{n-1})(1-R_n)$. The reflected signal then arrives back at grating $G_{n-1}$ whereupon the fraction that is transmitted through the grating is $(1-R_n)$ and the remainder is reflected back again. Thus, the signal that has initially passed through grating $G_{n-1}$, been reflected by grating $G_n$ and has passed back through grating $G_{n-1}$, has an intensity $I_{n-1}(1-R_{n-1})^2 R_n$. The optimum system is obtained by setting the intensity of the reflection from grating $G_{n-1}$ to be equal to the intensity of the reflection from grating $G_n$ as seen at point 1 of the system, i.e.

$$I_{n-1}R_{n-1}=I_{n-1}(1-R_{n-1})^2 R_n$$

cancelling $I_{n-1}$ leads to the quadratic equation:

$$R_n R^2_{n-1}-(1+2R_n)R_{n-1}+R_n=0 \qquad \text{IV}$$

which has the solution:

$$R_{n-1}=\frac{(2R_n+1)-(1+4R_n)^{\frac{1}{2}}}{2R_n} \qquad \text{V}$$

The other solution of the quadratic equation involves the intensity of the signal increasing upon reflection and is not considered here.

Thus, the reflectivity of the grating that is most remote from the monitoring arrangement may be set arbitrarily and the reflectivity of the penultimate grating is given by equation V. This operation can then be repeated for each grating using the reflectivity of the adjacent that has previously been calculated.

Figure 2:
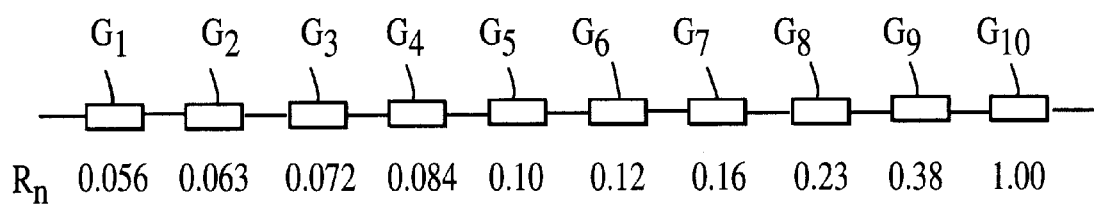
FIG. 2 shows schematically a linear optical line system according to the invention.
Figure 3:
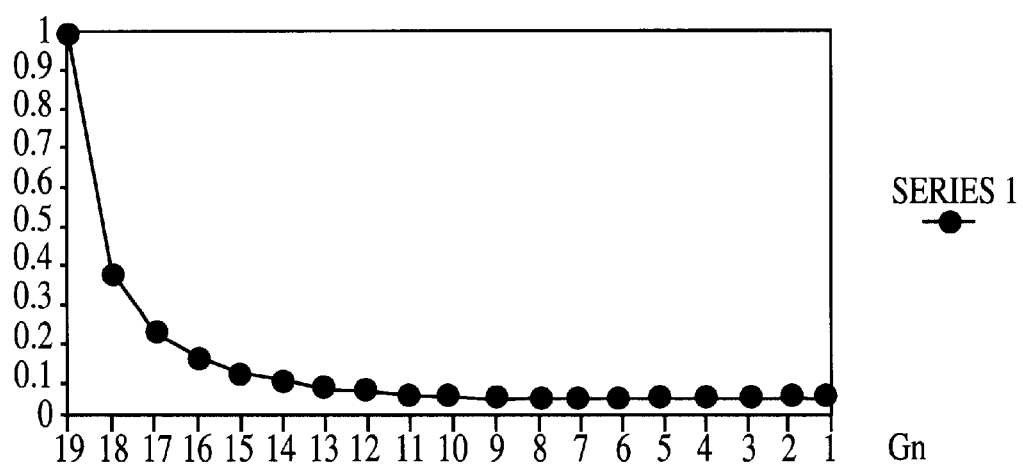
FIG. 3 is a graphical representation of the reflectivities of the gratings along one line system according to the invention.

FIG. 2 shows schematically a linear optical system having ten Bragg gratings $G_1$ to $G_{10}$ and shows the reflectivity $R_n$ for each grating required to produce a constant amplitude reflected signal at the monitoring arrangement, the intensity of the reflections being maximised by setting the reflectivity of the last grating $G_{10}$ to unity. FIG. 3 is a graph of the reflectivities required for constant intensity of the reflected signal in a slightly longer linear system having 19 Bragg gratings, the most remote 10 gratings having the same reflectivities as those shown in FIG. 2.

It can be observed from FIGS. 2 and 3 that only the few gratings most remote from the monitoring arrangement have significant (and significantly different) reflectivities: for example all the gratings in the system other than the three most remote gratings have reflectivities less than 0.2, and all but the six most remote gratings have reflectivities less than 0.1.This is true irrespective of the length of the system, so that additional gratings could be incorporated into the system on the near end of the fibre without affecting the reflectivities of the more remote gratings. Indeed, it may be possible to obtain a good approximation to the optimum condition of equal reflected signal intensity by incorporating a series of gratings having uniform reflectivity. For example, if an array of the ten most remote gratings of a longer system have reflectivities as shown in FIG. 2 in which the lowest reflectivity grating $G_1$ has a reflectivity of 0.056 or 5.6%, an additional array of gratings can be incorporated at the near end of $G_1$, each having a constant reflectivity in the range of from 1% to 5% (depending on the length of the array) while maintaining a generally constant signal to noise ratio over the entire length of the combined array.

In the case of a branched network, for example a PON, there will often be a splitter S located between adjacent Bragg gratings as shown in FIG. 1. If the splitter has a transmission coefficient T, the intensity of the signal will be multiplied by T upon each transit of the signal through the splitter. Thus T will typically have a value of 0.5 for a 2:1 splitter and, in general, $n^{-1}$ for an n:1 splitter. In this case, the signal that has passed through grating $G_{n-1}$ will have an intensity of $I_{n-1}(1-R_{n-1})^2 T^2 R_n$. By setting this to equal the intensity of the signal reflected from grating $G_{n-1}(I_{n-1}R_{n-1})$ the quadratic equation VI is obtained $$T^2 R_n R^2_{n-1}-(1+2T^2 R_n) R_{n-1}+T^2 R_n=0 \qquad \text{VI}$$

which is the same as equation IV except that $R_n$ has been replaced by $T^2 R_n$. The relationship for the reflectivity of the (n−1)th grating then becomes:

$$R_{n-1} = \frac{(2T^2 R_n + 1) - (1 + 4T^2 R_n)^{\frac{1}{2}}}{2T^2 R_n} \qquad \mathrm{I}$$

Figure 4:
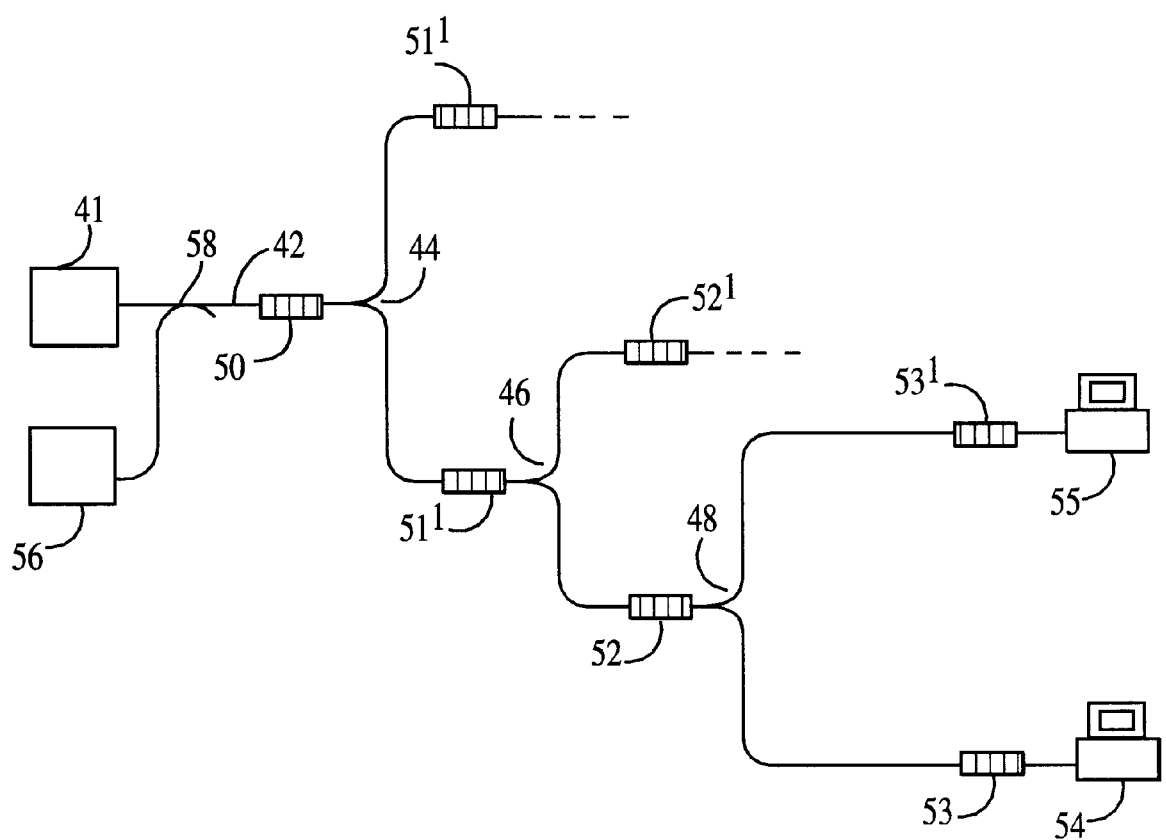
FIG. 4 shows an optical line system having a different topology which may be employed in a passive optical network.

As an example of such a system, FIG. 4 shows a network which comprises an exchange or head end 41 from which an optical fibre 42 extends. The optical fibre 42 branches by means of 2:1 splitters 44, 46, and 48 into a number of branches, and the fibre 42 together with each of the branches thereof contains a Bragg grating 50, 51, 51', 52, 52' and 53, 53', the last gratings being located at end users 54 and 55. A monitoring arrangement 56 is located in the region of the exchange and is coupled into the fibre 42 by a 3 dB coupler 58.

If gratings 53 and 53' each have reflectivities of approximately 100%, application of equation I leads to the reflectivities of the other gratings as given in the following table:

TABLE

| Grating | Reflectivity (Rn)/% |
|---|---|
| 53 | 100 |
| 52 | 17.2 |
| 51 | 3.8 |
| 50 | 1.0 |

I claim:

1. An optical line system which comprises:
    (i) an optical fibre that includes a plurality of reflectors (G, 50, 51, 51', 52, 52', 53, 53') located at different positions along the optical fibre; and
    (ii) a monitoring arrangement (56) located in the region of one end of the optical fibre for monitoring the system by an optical reflectometry method in which light is reflected by the reflectors:
        characterised in that at least two of the reflectors have reflectivities that differ from one another, the reflector ($G_n$) that is more distant from the monitoring arrangement having a higher reflectivity than the reflector ($G_{n+1}$) that is nearer to the monitoring arrangement, so as to give a generally constant signal-to-noise ratio of the reflected light received by the monitoring arrangement.

2. A system as claimed in claim 1, in which the optical fibre includes at least three reflectors (G) whose reflectivites increase in order of distance from the monitoring arrangement.

3. A system as claimed in claim 2, wherein the difference between the reflectivities of adjacent reflectors (G) increases in order of distance from the monitoring arrangement.

4. A system as claimed in claim 1, which has no branches between the penultimate reflector and the last reflector, and the penultimate reflector has a reflectivity in the range of from 0.3 to 0.5 times the reflectivity of the last reflector.

5. A system as claimed in claim 1, which includes a 2:1 branch (44, 46, 48) between the penultimate reflector and the last reflector, and the penultimate reflector has a reflectivity in the range of from 0.1 to 0.25 times the reflectivity of the last reflector.

6. A system as claimed in claim 1, wherein the optical fibre includes at least three reflectors (G) whose reflectivities substantially are based on the relationship (I):

$$R_{n-1} = \frac{(2T^2 R_n + 1) - (1 + 4T^2 R_n)^{\frac{1}{2}}}{2T^2 R_n} \qquad (\mathrm{I})$$

where:
- $R_n$ is the reflectivity of the n th reflector ($G_n$) from the monitoring arrangement,
- $R_{n-1}$ is the reflectivity of the (n−1)th reflector ($G_{n-1}$) from the monitoring arrangement, and
- T is the transmission coefficient of any branch (44, 46, 48) that may be present between the (n−1)th and the n th reflector (and is unity if no such branch exists).

7. A system as claimed in claim 1, wherein the optical fibre includes at least 20 reflectors (G), at least the three reflectors closest to the monitoring arrangement having substantially the same reflectivities.

* * * * *